Figure 1:
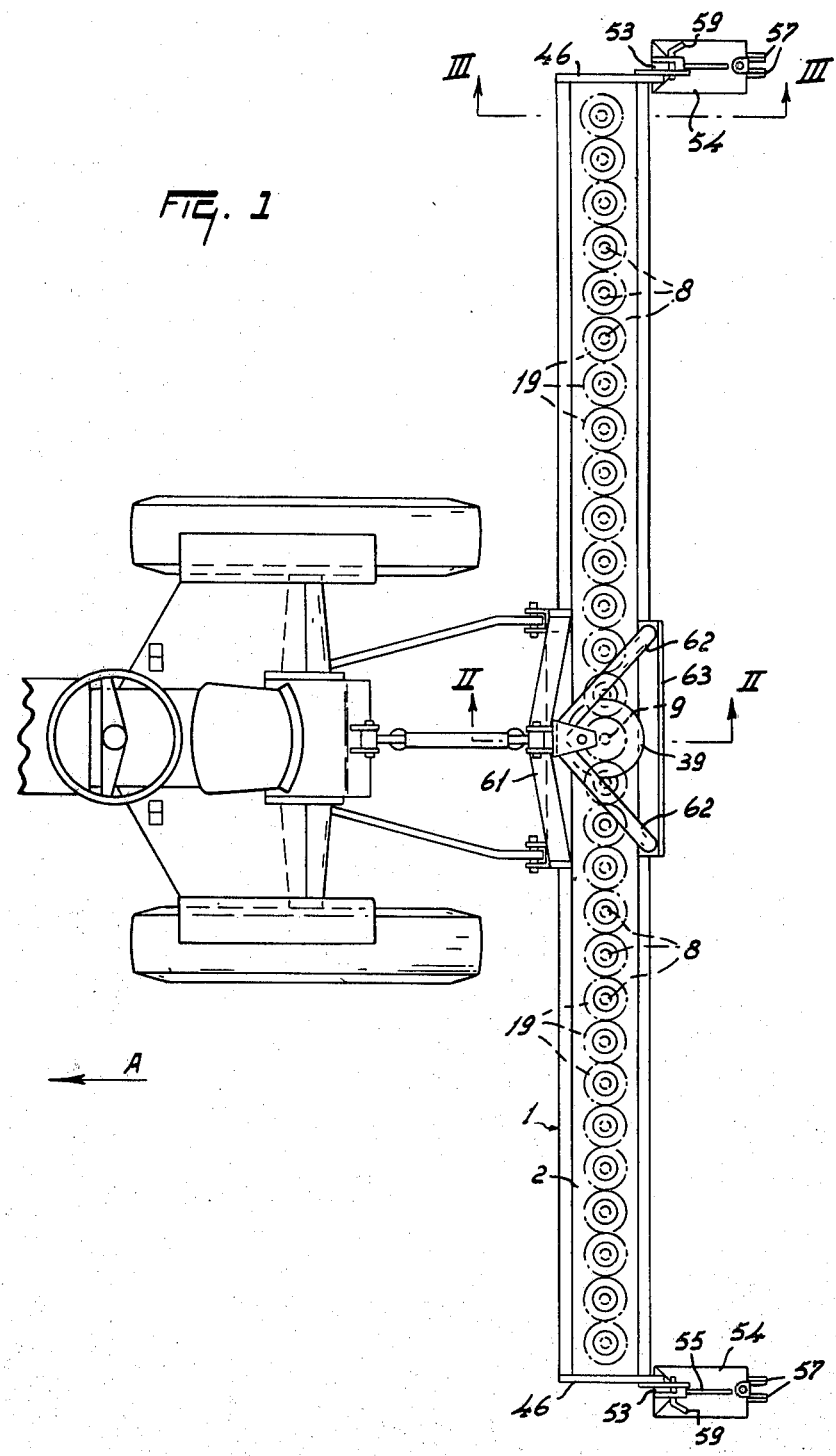

United States Patent [19]

van der Lely

[11] 4,300,639
[45] Nov. 17, 1981

[54] SOIL CULTIVATING MACHINES

[76] Inventor: Cornelis van der Lely, 7, Brüschenrain, Zug, Switzerland

[21] Appl. No.: 39,690

[22] Filed: May 16, 1979

[30] Foreign Application Priority Data

| May 18, 1978 | [NL] | Netherlands | 7805361 |
| May 18, 1978 | [NL] | Netherlands | 7805363 |
| May 23, 1978 | [NL] | Netherlands | 7805545 |
| May 23, 1978 | [NL] | Netherlands | 7805546 |
| May 25, 1978 | [NL] | Netherlands | 7805665 |

[51] Int. Cl.³ .............................................. A01B 33/06
[52] U.S. Cl. .................................... 172/49.5; 172/78; 172/80
[58] Field of Search ............... 172/49, 59, 111, 78, 172/80, 415, 79, 413, 387, 393

[56] References Cited

U.S. PATENT DOCUMENTS

| 455,170 | 6/1891 | Cleveland | 172/57 |
| 2,088,141 | 7/1937 | Royston | 172/59 |
| 2,577,885 | 12/1951 | Gay | 172/413 |
| 2,582,364 | 1/1952 | Tice | 172/59 X |
| 2,845,015 | 7/1958 | Carawan | 172/79 X |
| 3,012,615 | 12/1961 | Pawela | 172/78 |
| 3,129,772 | 4/1964 | Anderson | 172/111 |
| 3,538,987 | 11/1970 | Taylor | 111/7 |
| 3,616,862 | 11/1971 | Lely | 172/47 |
| 3,897,831 | 8/1975 | Lely | 172/59 |
| 3,983,943 | 10/1976 | Lely | 172/59 X |
| 4,002,209 | 1/1977 | Lely | 172/59 X |
| 4,018,170 | 4/1977 | Lely | 111/7 |

Primary Examiner—Richard J. Johnson

[57] ABSTRACT

A soil cultivating machine has a row of cultivating members which are mechanically driven and rotatable about upwardly extending axes positioned on a transverse row. An elongated, transverse hollow frame portion supports at least twenty shafts of the cultivating members and the shafts are preferably about 15 cms apart. Transmission parts of the members are housed in the frame portion. The frame portion comprises two U-shaped parts clamped together at longitudinal edges between which edges gasket material and spacer members hold the longitudinal edges at a predetermined distance from one another. The cultivating members can each have a single downwardly extending tine with an upper flat fastening portion that extends substantially transversely of the rotary axis of the cultivating member, and a lower operative portion that joins the flat fastening portion eccentrically of the rotary axis of the cultivating member. At each side of the frame portion a supporting skid is adjustably connected to plates which close the hollow frame portion.

12 Claims, 18 Drawing Figures

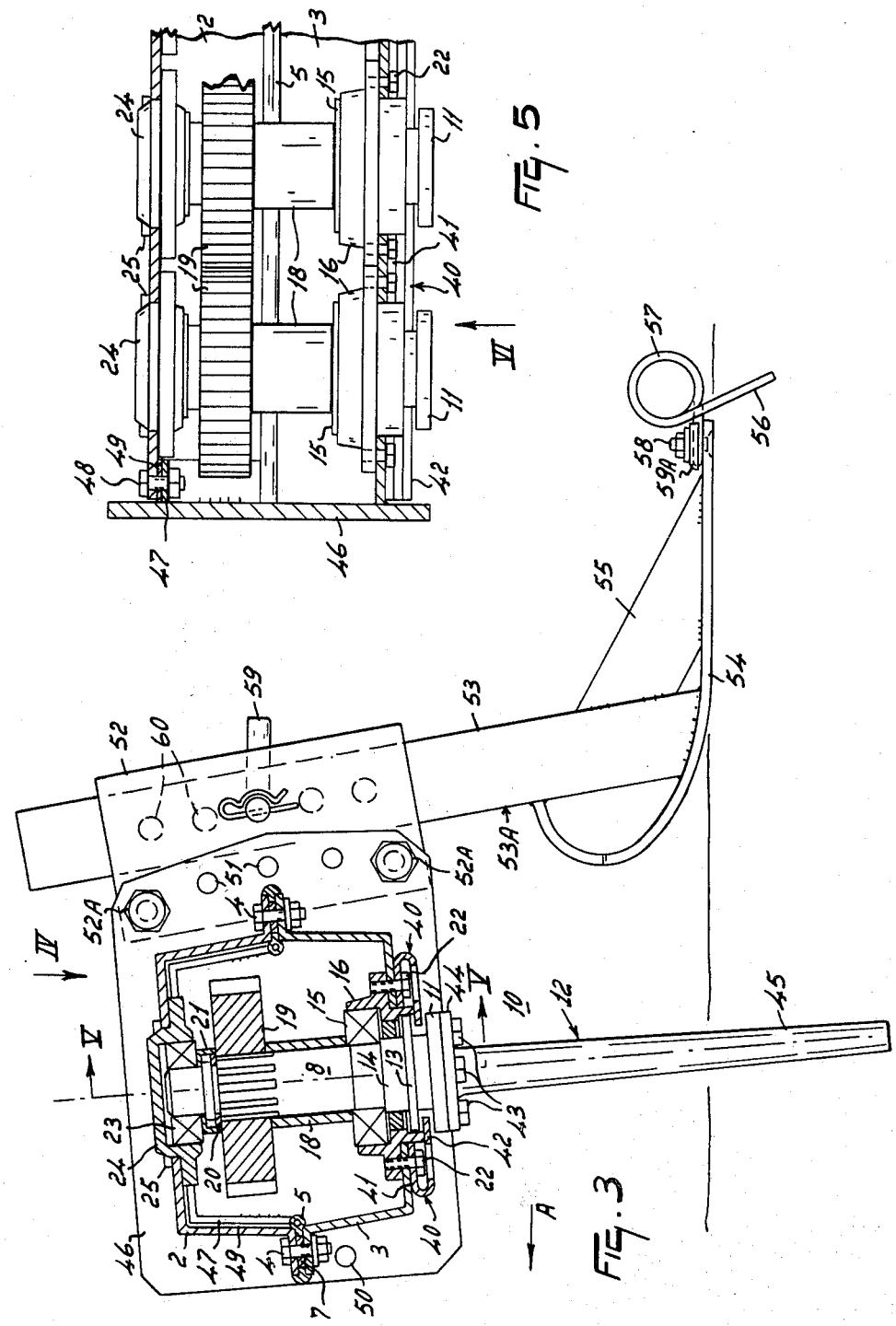

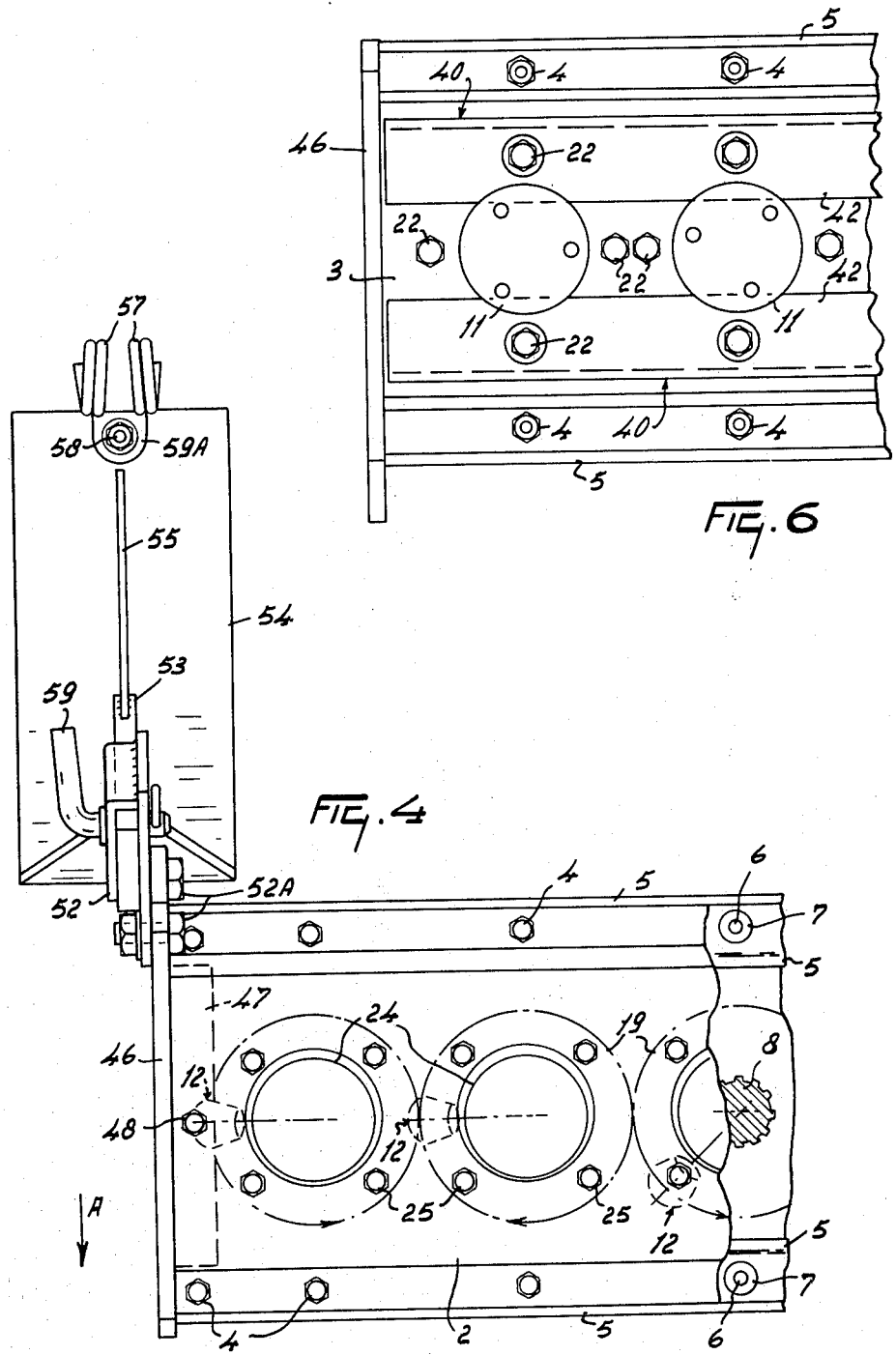

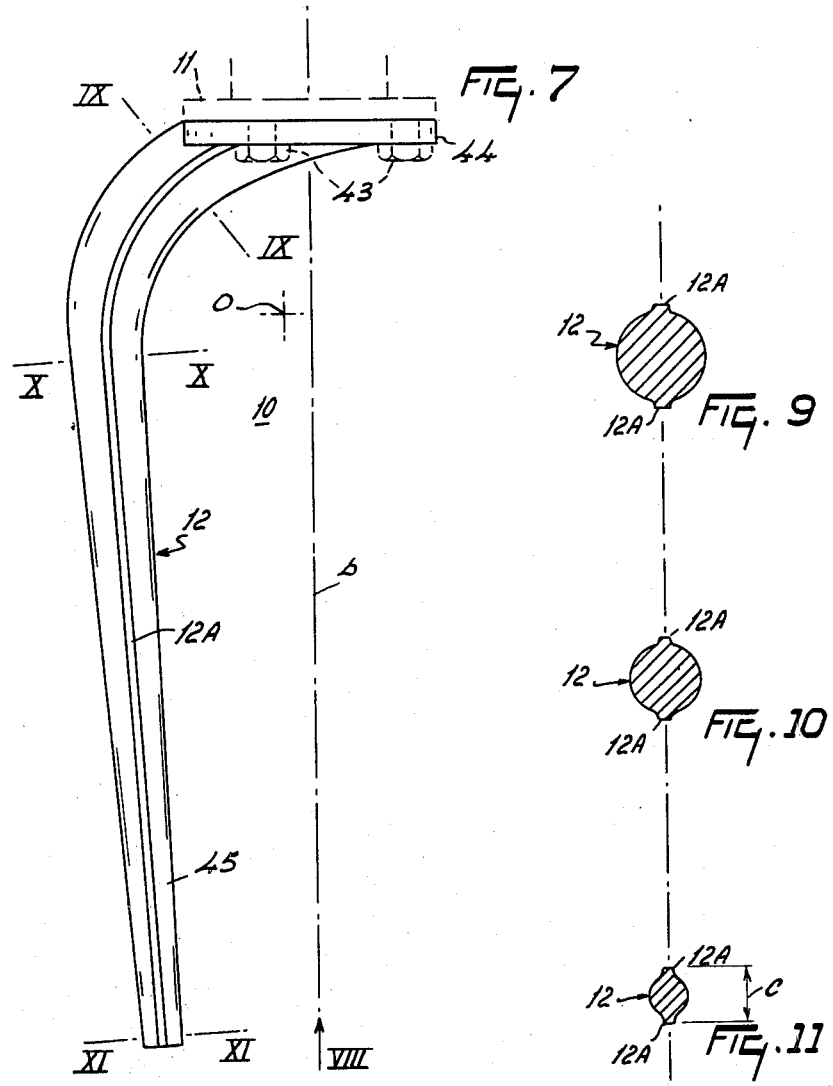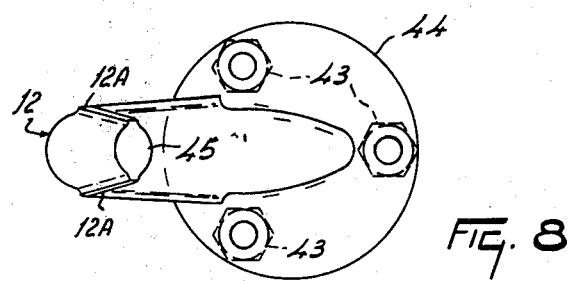

SOIL CULTIVATING MACHINES

This invention relates to soil cultivating machines comprising a frame and a plurality of cultivating members which are mechanically driven and rotatable about upwardly extending axes.

In order to obtain a great working width with machines of the above kind, a number of transverse frame parts each carrying a group of soil cultivating members are pivotably connected with each other. However, the provision of pivotable connections increases the costs, whereas these connections also are subject to damage.

With the construction according to the invention, the abovementioned disadvantages can be prevented and according to the invention there is provided a soil cultivating machine comprising a frame and a plurality of cultivating members which are mechanically driven and rotatable about upwardly extending axes, the frame comprising a transverse rigid frame portion in which at least twenty shafts of side-by-side arranged soil working members are supported.

Figure 2:
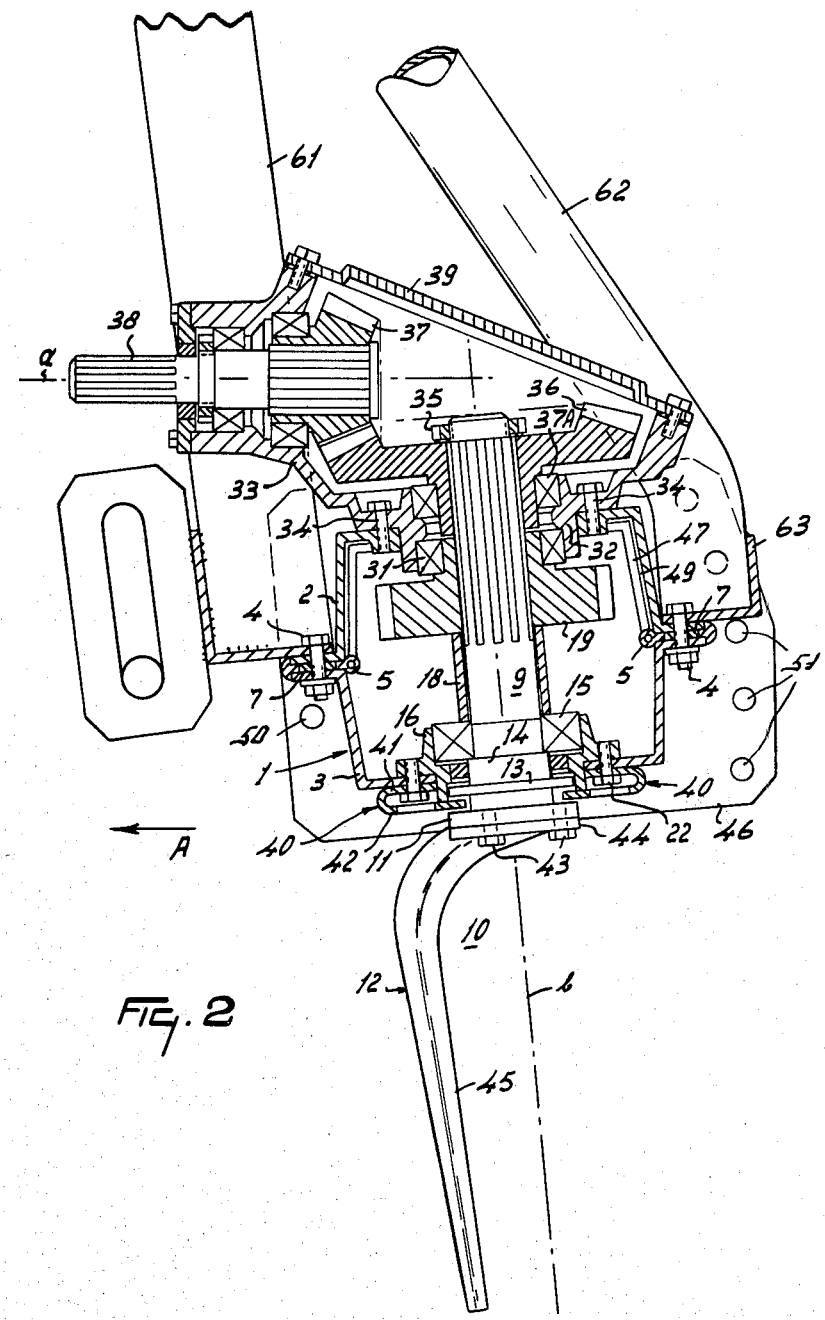
Figure 12:
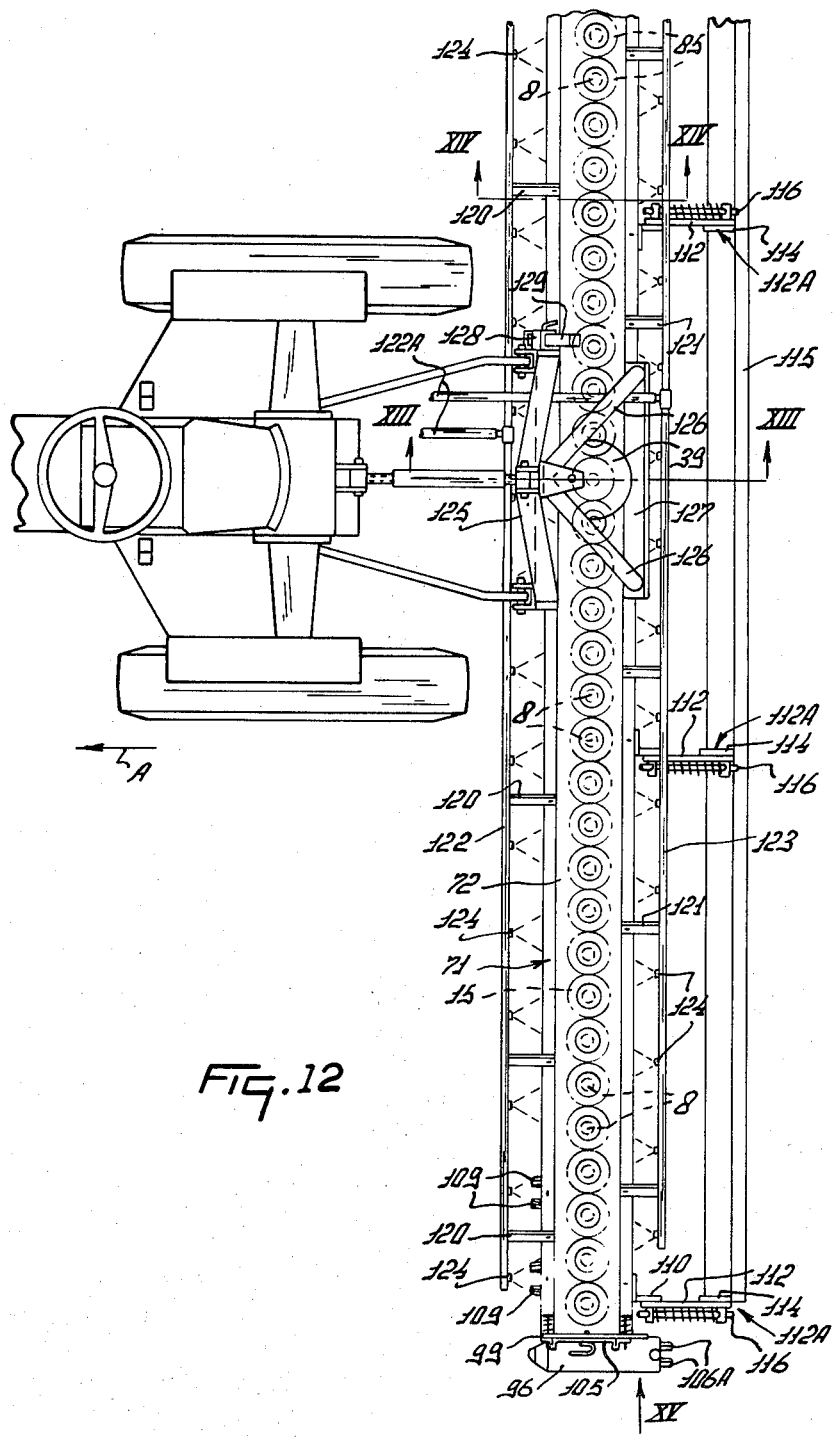
Figure 13:
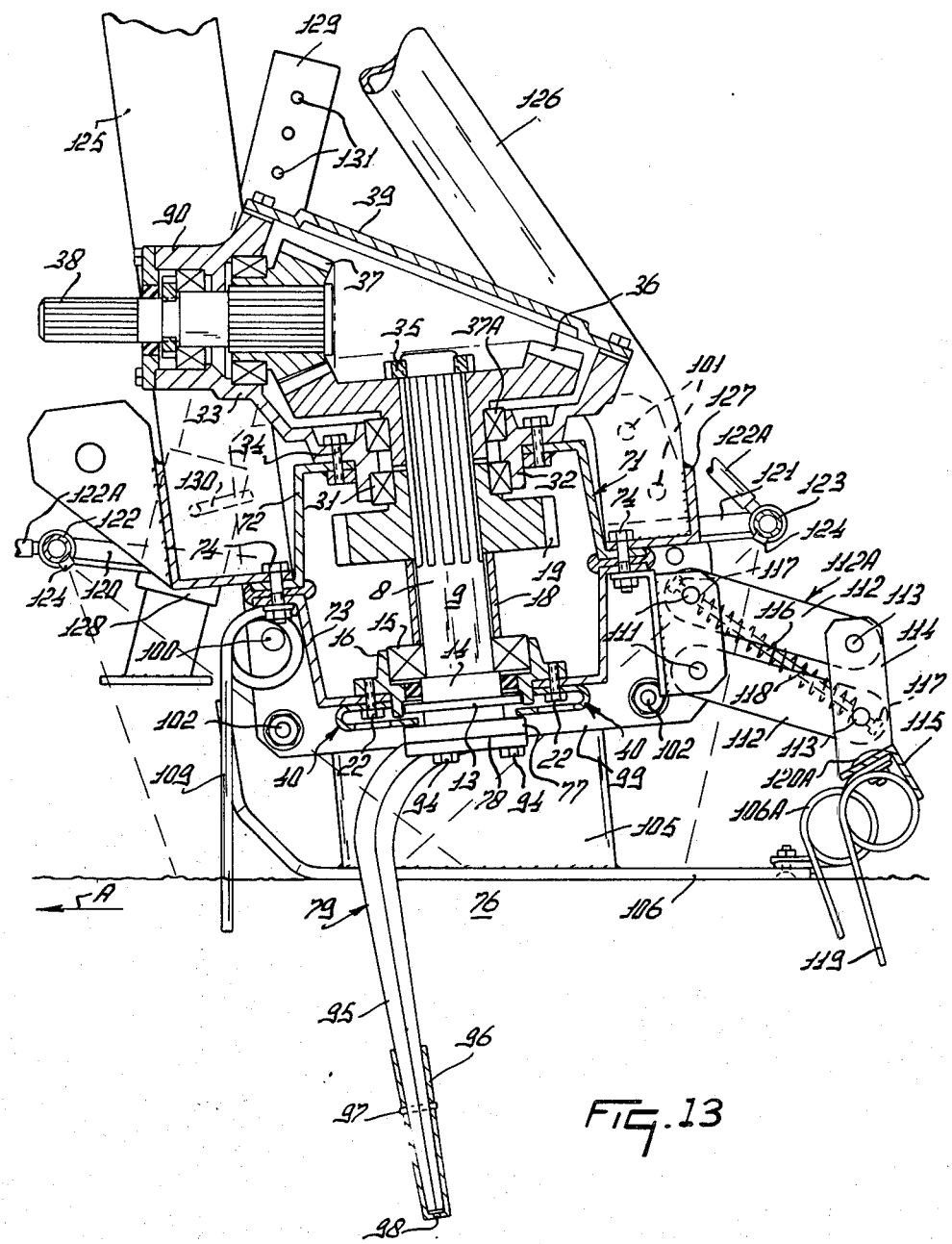
Figure 14:
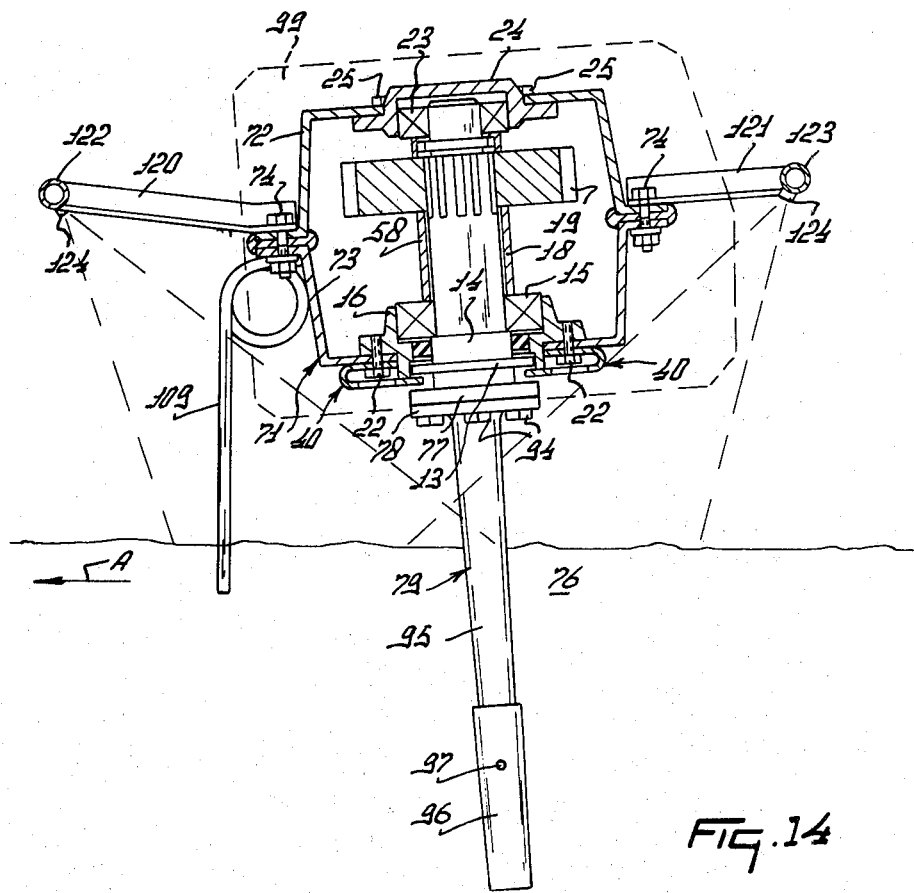
Figure 15:
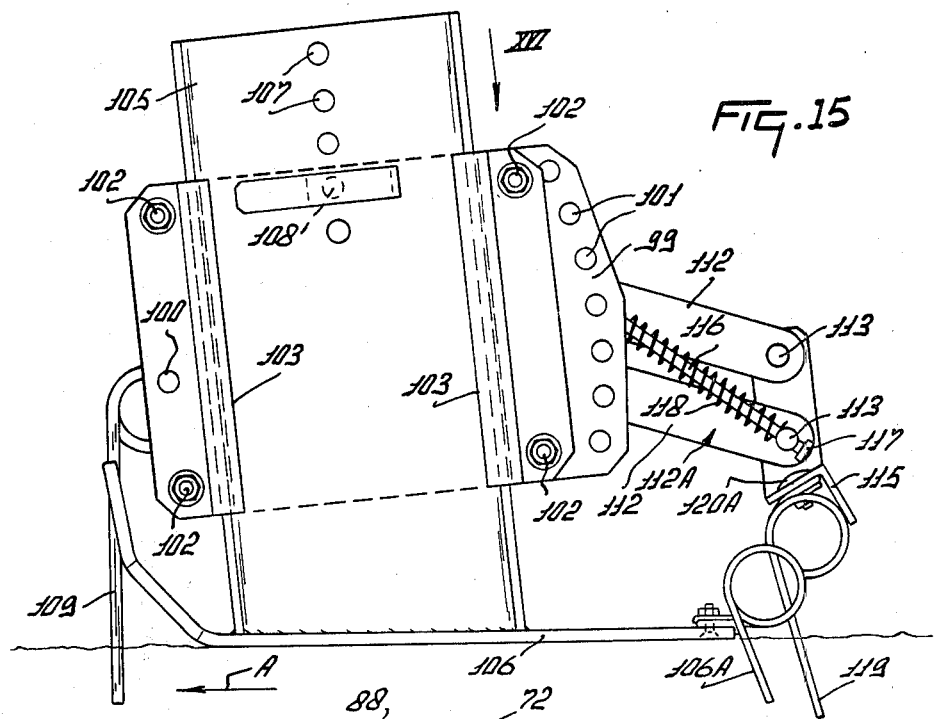
Figure 16:
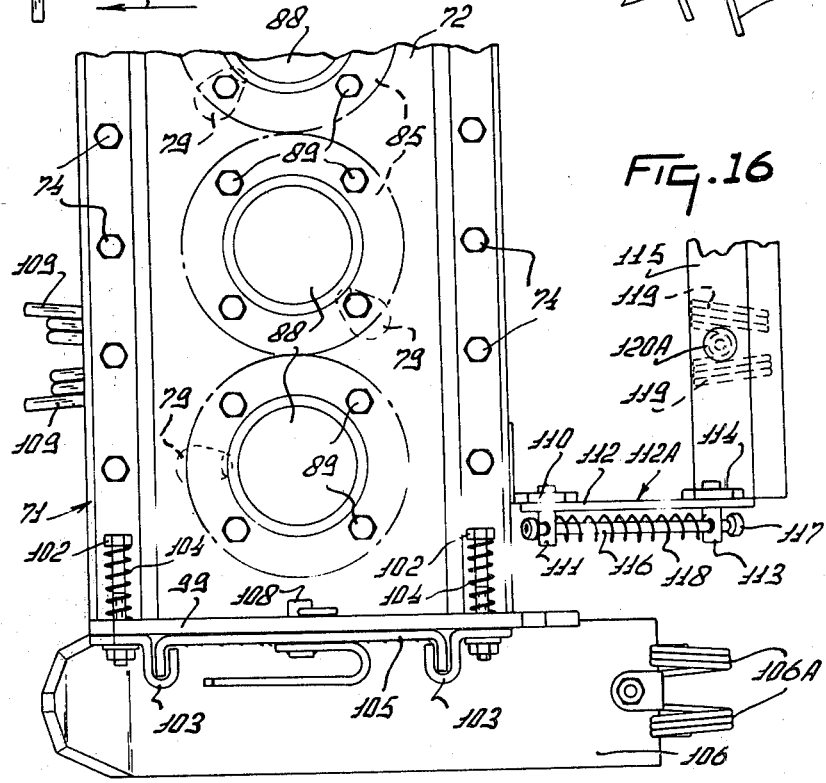
Figure 17:
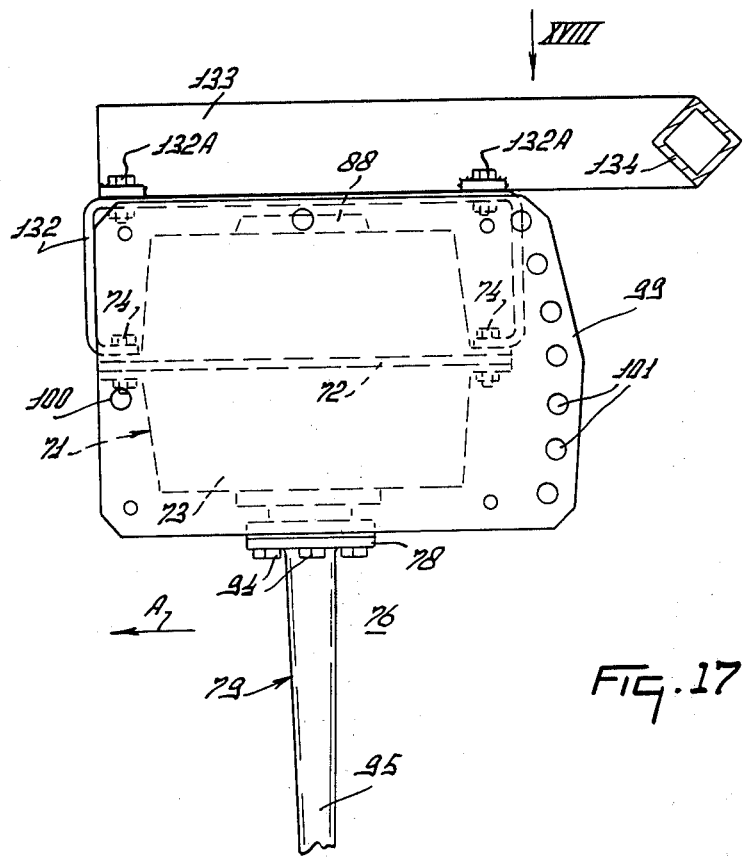
Figure 18:
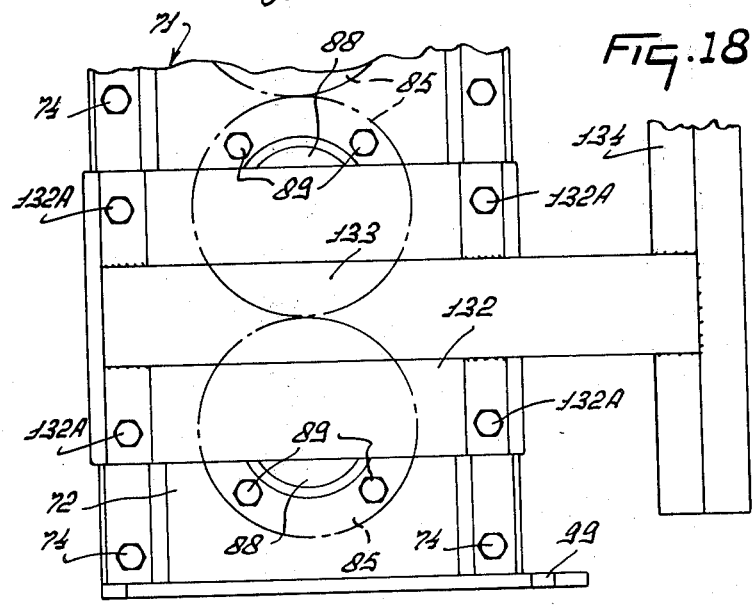

For a better understanding of the invention and to show how the same may be carried into effect, reference will now be made, by way of example, to the accompanying drawings in which:

FIG. 1 is a plan view of a first form of soil cultivating machine, shown coupled to a tractor, FIG. 2 is a cross-sectional view taken on line II—II in FIG. 1 and on a larger scale, FIG. 3 is a cross-sectional view taken on line III—III in FIG. 1 and on a larger scale, FIG. 4 is a plan view partly broken away and in section taken in the direction of arrow IV in FIG. 3, FIG. 5 is a cross-sectional view taken on the line V—V in FIG. 3, FIG. 6 is a view from below taken in the direction of arrow VI in FIG. 5, FIG. 7 shows on a larger scale a tine of a cultivating member of the soil cultivating machine, FIG. 8 is a view from below taken in the direction of arrow VIII in FIG. 7, FIGS. 9, 10 and 11 are cross-sectional views of the tine shown in FIG. 7 taken, respectively, on lines IX—IX, X—X and XI—XI in FIG. 7, FIG. 12 is a plan view of part of a second form of soil cultivating machine, shown coupled to a tractor, FIG. 13 is a cross-sectional view taken on line XIII—XIII in FIG. 12 and on a larger scale, FIG. 14 is a cross-sectional view taken on line XIV—XIV in FIG. 12 and on a larger scale, FIG. 15 is a side view on a larger scale in the direction of arrow XV in FIG. 12, FIG. 16 is a plan view taken in the direction of arrow XVI in FIG. 15, FIG. 17 is a side view showing a form in which a frame portion of the machine is provided at the top with a support for a mounting bar for the attachment of tools to be combined with the machine, and FIG. 18 is a plan view taken in the direction of arrow XVIII in FIG. 17.

The soil cultivating machine illustrated in FIGS. 1 to 11 has a hollow box-like frame portion 1 extending transversely of the intended direction of operative travel A of the machine. This frame portion 1 includes two identical U-shaped parts 2 and 3 of sheet material. The parts 2 and 3 have each bent-over longitudinal edges clamped together by bolts 4. Between these edges there is elastic stuffing material 5 which has holes 6 through which the bolts 4 pass, each through a spacer member in the form of a metal ring 7 embedded in the material 6 so that when the bent-over longitudinal edges are fastened to one another the metal rings 7 hold the edges at such a distance from one another than excessive compression of the elastic stuffing material 5 is avoided.

From FIG. 2 it will be noted that the inner edge of the elastic stuffing material 5 is a hollow bead engaging the inner faces of the parts 2 and 3 of the frame portion 1, whereas the outer edge of the material 5 is a solid bead covering the outer faces of the longitudinal edges that are clamped together and being rounded off on the outer face.

In the box-like frame portion 1 are journalled, in total, twenty nine cultivating members 10 that extend in a row that is transverse to the operative travelling direction A. The central member 10 is adapted to rotate about an upwardly extending shaft 9. The remaining twenty eight members 10 rotate about upwardly extending shafts 8. The longitudinal center lines b of the shafts 8 and the shaft 9, which constitute the rotary axes of the cultivating members 10, are preferably at a distance of about 15 cms. from one another. Each of the shafts 8 and the shaft 9 is provided at its bottom end, where it projects out of the box-like frame portion 1, with a flat, circular part 11 extending transversely of the center line b of the shaft and forming a carrier, to which, in a manner to be described more fully hereinafter, a flat fastening portion 44 of a tine 12 is secured. Above the carrier 11 each shaft 8 or 9 is provided with a flange 13, the diameter of which corresponds with that of the carrier 11 at the bottom end of the shaft. This flange 13 joins a shoulder 14, the top of which supports a ball bearing 15 that is in a bearing housing 16. The bottom of this housing 16 is closed by the flange 13. The top of the bearing 15 supports a spacer sleeve 18 on which bears a pinion 19 slipped onto the top end of the shaft 8 or 9. In the case of each shaft 8, the pinion 19 is secured to its shaft by means of two half-rings 20 located inside a spacer ring 21 (FIG. 3). The assembly of the bearing housing 16, the spacer sleeve 18 and the pinion 19 may be prefabricated with the shaft and be mounted as a single unit in the lower part 3 of the frame portion 1 by fixing the bearing housing 16, with the aid of bolts 22, in a corresponding opening. The spacer ring 21 supports a ball bearing 23 holding the top end of each shaft 8. The bearing 23 is surrounded by a bearing housing 24 which is fixed by means of bolts 25 from without in the upper part 2 of the box-like frame portion 1. The pinions 19 of the respective shafts 8 engage one another and the pinion 19 on the central shaft 9. In the case of the pinion 19 on the shaft 9 its hub is upwardly prolonged (FIG. 2) and is provided with a ball bearing 31 in a housing 32 which forms part of a gear box 33 located on the top of the box-like frame portion 1, fixed by means of bolts 34 to the top part 2 of the frame portion 1. The shaft 9 extends into the gear box 33 and carries within the gear box, by means of a nut 35 co-operating with screwthread at the top end of the shaft, a bevel pinion 36. A downwardly prolonged hub of the bevel pinion 36 is supported by means of a ball bearing 37A in the bearing housing 32. Inside the gear box 33 the bevel pinion 36 is in mesh with a bevel gear wheel 37 on a shaft 38 extending in the direction of movement A and projecting out of the front of the gear box. The longitudinal center line a of the shaft 38 is at an angle of more than 90° to the longitudinal centre line b of the shaft 9. The top of the gear box 33 is closed by a plate 39 which is inclined downwards from front to rear.

By means of the bolts 22, by which the bearing housings 16 are fastened to the lower part 3 of the frame portion 1, screening members 40 each covering the whole length of the frame portion 1 are held on in front of, and the other behind, the shafts 8 and the shaft 9, each of these members 40 being of U-shape with the limbs 41, 42 of the U disposed one above the other. The upper limb 41 is clamped by means of the bolts 22 to the lower face of the lower frame portion part 3, whereas the lower limb 42 is in contact with the lower edge of each bearing housing 16 and extends inwardly into the gap between the flange 13 and the carrier 11, that is to say inside the outer circumference of the carrier 11. The limb 42 of each screening member 40 has clearance holes for the bolts 22.

To the carrier 11 at the lower end of each shaft 8 and the shaft 9 is fastened, by means of bolts 43, the flat fastening portion 44 of the associated tine 12. The tine 12 has an operative portion 45 which tapers towards its free end and which joins through a regular curve the flat fastening portion 44. The operative portion 45 of the tine 12 joins, via this curve, the flat fastening portion 44 in a manner such that is longitudinal center line is located eccentrically of the center of the portion 44, through which center extends the rotary axis b of the cultivating member. From the Figures it will be noted that the junction between the operative portion 45 of the tine 12 and the fastening portion 44 is mainly to one side of the fastening portion 44 with respect to the center of the portion 44. One of the three bolts 43 serving to fasten the tine 12 is passed through an opening in the fastening portion 44 that is located just behind (FIG. 8) the junction between the operative portion 45 and the fastening portion 44, whereas the two further bolts 43 are passed through openings located one on each side of the junction between the operative portion and the fastening portion. The operative portion 45 of each tine 12 tapers in straight-line fashion from its curve towards the free end in wedge-shaped fashion so that at the free end the largest distance, c (FIG. 11) between two opposite faces extends in a tangential direction with respect to a circle centered on the rotary axis of the cultivating member.

The regular curve in each tine, mentioned above, forms part of a circle, the center of which is located, at O (FIG. 7) between the rotary axis b of the cultivating member and the main part of the operative portion of the tine. This curved part has a substantially circular cross-section that is initially prolonged in the remainder of the operative portion 45 and then gradually changes into the wedge shape discussed above (FIGS. 9 to 11). At the front and the rear with respect to the direction of rotation of the cultivating member, each tine has a ridge 12A extending from the free end up to the fastening portion 44. From FIG. 2 it will be seen that the straight part of the operative portion 45 is directed slightly inwardly with respect to the rotary axis b of the cultivating member.

The ends of the frame portion 1 are closed by upwardly extending plates 46. The lower part 3 of the frame portion 1 is welded to each of these plates 46, whereas the upper portion 2 bears on a supporting strip 47 that is fast on the plate 46 and that has the portion 2 secured to it by means of a bolt 48 located near the center of the top of the strip 47. Between the supporting strip 47 and the upper part 2 of the frame portion 1 there is stuffing material 49. In front of the lower part 3 of the frame portion 1 each plate 46 has a hole 50 and near the rear a row of holes 51. The holes 51 lie on the arc of a circle, the center of which coincides with the center of the hole 50 at the front. By means of bolts 52A passed through the upper and lower holes 51 a holder 52 is secured to the rear of the plates 46, in which holder an upwardly extending carrier 53 of a supporting member 53A is displaceable in a direction of height. The lower end of the carrier 53 is provided with a substantially flat skid 54 which extends in front of the carrier and is secured by an upwardly and rearwardly bent part, at a zone above the lower end of the carrier. Between the rear of the carrier 53 and the top surface of the skid 54 a strut 55 is located near the center of the skid. Just behind the strut 55 there are two comparatively short tines 56 made from a single length of resilient material, these tines, each of which forms a soil loosening member that has a downwardly and rearwardly inclined operative portion extending from a coil 57, being interconnected by a hairpin-shaped portion located between the tines and fastened by means of a bolt 58 and a clamping piece 59A just behind the strut 55 to the top face of the skid. For setting the working depth of the cultivating members 10 the carrier 53 can be set and fixed in any one of a plurality of positions by means of a pin 59, which can be passed through a hole near the center of the holder 52 and through a selected one of a plurality of superjacent holes 60 in the carrier 53. During operation the carriers 53 each occupy a position as shown in FIG. 3, in which the carrier is substantially parallel to the axes of rotation of the adjacent cultivating member 10, which axis slightly slopes forwardly at an angle of preferably about 5° to the vertical.

At the central part of the machine there is a trestle 61 for coupling the machine with the three-point lift of a tractor. The top of the trestle 61 is connected by means of downwardly and rearwardly diverging supports 62 with an angle-section iron 63 which is secured to the clamped longitudinal edges of the parts 2 and 3 at the rear of the frame portion 1.

The tines 12 of the respective cultivating members 10 are positioned with a relative phase difference, which is about 45° for cultivating members rotating in the same sense, viewed from one tine of one cultivating member extending, viewed in plan, parallel to the direction of travel A of the machine. This phase difference imparts to the machine when operating a quiet run. During operation the machine is coupled by means of the trestle 61 with the three-point lift of a tractor and the shaft 38 projecting from the front of the gear box is linked through an auxiliary shaft to the power take-off shaft of the tractor so that through the driving gear described above the respective cultivating members 10 can be driven so that neighbouring cultivating members rotate in opposite senses. The operative positions of the tines, which as stated above extend in the direction of their free ends slightly towards the rotary axes of the cultivating members, work overlapping strips of soil about 16 cms wide so that overall an uninterrupted strip of soil is worked. Where there are twenty nine cultivating members spaced apart by a distance of 15 cms between their axes the overall width of soil worked is about 4.50 ms. Owing to the particular design of the tines, in which the operative portion joins the fastening portion eccentrically of the center of the plate-shaped fastening portion, a large space is left to permit to pass stones contained in the soil, when the operating tines encounter them, while the upwardly broadening, curved part of the operative portion tends to ensure effective crumbling.

With the aid of the skids 54 supported near the ends of the frame portion each in a single holder, each displaceable in a direction of height, and each located behind the frame portion 1, the working depth of the cultivating members 10, whose rotary axes, as stated above, are slightly sloping forwardly during operation, can be effectively adjusted. Instead of the skids 54 the machine may be provided with a support covering the whole width of the machine. This support may be pivotally supported, with respect to the frame portion, at its front with the aid of arms and the holes 50, and can be fixed in one of a plurality of positions in a direction of height with the aid of the holes 51 in the plates 46.

The machine that has been described has more than twenty shafts of cultivating members 10 journalled in its rigid frame portion 1, which is self-supporting over a width of at least 4 ms owing to its particular, essentially polygonal cross-section. The construction described provides a frame portion which carries the cultivating members over a comparatively large working width and which can, in addition, perform a soil levelling function in operation of the machine so that this frame portion has two functions. The screens that are provided, i.e., the screening members 40, which extend into the proximity of the shafts of the cultivating members, and in fact to beneath the bearing housings of the bearings that support these shafts, serve to protect the bottom of the frame portion and the bearings of the shafts against damage particularly from stones.

The soil cultivating machine shown in FIGS. 12 to 18 also has a box-like frame portion 71 extending transversely of the direction of operative travel A of the machine. The frame portion 71 includes two identical U-shaped parts 72 and 73 of sheet material. The parts 72 and 73 have each bent-over longitudinal edges clamped together by bolts 74. Between these edges there is elastic stuffing material having holes through which the bolts pass, each through a spacer member formed by a metal ring embedded in the material so that when the bent-over longitudinal edges are fastened to one another the metal rings hold the edges at such a distance from one another than an excessive compression of the elastic stuffing material is avoided.

In the frame portion 71 a total of thirty nine cultivating members 76 rotatable about upwardly extending shafts 8 and a shaft 9 are journalled in the manner described above, these cultivating members being driven in the way already described. The frame portion 71 is disposed so that the shafts 8 and the shaft 9 are inclined forwardly at an angle of about 5° to the vertical. The longitudinal center lines of the shafts 8 and the shaft 9, which form the rotary axes of the cultivating members, are preferably also spaced apart by a distance of about 15 cms. Each of the shafts 8 and the shaft 9 is provided at the lower end, which emerges from the frame portion 71, with a flat, circular part 77 extending transversely of the longitudinal center line of the shaft and forming a carrier to which a flat fastening portion 78 of a tine 79 is secured by means of bolts 94.

Each tine 79 has an operative portion 95 which tapers towards its free end, and which joins the fastening portion 78 through a regular curve. The lower end of each tine 79 is provided with a releasable sleeve 96 of wear-resistant material, which is fixed by means of a spring-loaded pin 97 and has a bore 98 on the lower end for facilitating mounting of the sleeve. From the Figure it will be apparent that the operative portion of the tine 79 joins the fastening portion through the regular curve just mentioned mainly on one side of the center of the fastening portion 78. The operative portion 95 of the tine 79 has a straight shape away from its curve and is slightly directed inwardly with respect to the rotary axis of its cultivating member 76.

The ends of the frame portion 71 are closed by upwardly extending plates 99. In front of the lower part 73 of the frame portion 71 each plate 99 has a hole 100 and near the rear a row of holes 101. The holes 101 are located on the arc of a circle, the center of which coincides with the center of the hole 100 at the front of the plate 99. Near the lower and top edges each plate has a hole in front of and behind the frame portion 71 for receiving a bolt 102, with the aid of which upwardly extending guide members 103 are mounted on the plate 99. By means of a spring 104 surrounding the bolt 102 and located between the head of the bolt and the plate 99 the guide members 103 are outwardly displaceable against spring force.

Inside a U-shaped portion of each of the guide members 103 is displaceable, in a direction of height, a limb of a U-shaped skid support 105, which extends upwardly and which depending from it a skid 106. The skid support 105 is secured to the inner longitudinal edge of the skid 106 (FIG. 16). The front of the skid 106 is bent over upwardly by two sharply bent, intermerging parts. At the rear two loosening tines 106 of resilient material are provided. Near the center the upwardly extending support 105 has a row of holes 107 through any one of which is passed a pin 108 provided with a handle, which pin is also passed through a hole near the top of the plate 99.

At the front of the frame portion 71 pairs of integral tines 109 of resilient material are fastened by the bolts 74 by means of which the longitudinal edges of the parts 72 and 73 of the frame portion 71 are clamped together. Each tine 109 extends from its fastening zone with the bolt 74 through at least one coil and then terminates in a downwardly extending straight part which extends substantially perpendicularly downwards, as will be seen from the Figures, in the position of the frame portion in which the axes of the cultivating members are inclined forwards at an angle of about 5° to the vertical.

On the rear of the frame portion 71 supports 110 are secured, at a distance from one another, by means of the bolts 74 clamping together the longitudinal edges of the parts 72 and 73 of the frame portion 71 these supports 110 having pivoted to them by means of horizontal pins 111 extending transversely of the direction of travel A of the machine rearwardly extending superjacent arms 112. The rear ends of the arms 112 are pivotally connected, by means of horizontal pins 113 extending transversely of the direction of travel A, with a support 114. The supports 114 are provided with a carrier 115 formed by an angle-section iron extending transversely of the direction of travel A of the machine and covering the whole extent of the frame portion 71. Between the topmost pin 111 near the frame portion 71 and the lowermost pin 113 near the support 114 a rod 116 is passed through bores in the respective pins. At its ends the rod 116 is provided with guard nuts 117 while between the pins 113 and 114 the rod 116 is surrounded by a spring 118. Below the carrier 115 pairs of tines 119 of resilient material are held, at a distance from one another, by means of bolts 120A. The tines 119 each have a loop partly enclosed inside the carrier 115 and each terminate in a downwardly and rearwardly inclined, operative portion.

On the front of the frame portion 71 and on the rear supports 120 and 121 respectively disposed at equal distances from one another hold spray booms 122 and 123 respectively. These booms are located substantially at the same level (FIG. 13) and, as will be seen from the FIG. 13, they are provided with spray nozzles 124 in front of and behind two neighbouring cultivating members 76, these nozzles being located, viewed in plan, substantially midway between the cultivating members concerned. The spray nozzles 124 of the leading spray boom 122 are off-set relatively to the spray nozzles 124 of the trailing spray boom 123. Each of the spray booms 122 and 123 communicates through a duct 122A with a reservoir (not shown) which may be carried by the tractor to which the machine is coupled.

Near the center the frame portion 71 is provided, at the front, with a trestle 125, the top of which is connected by means of diverging supports 126 with an angle-section iron 127 at the rear of the frame portion. On one side of the trestle 125 there is a holder 128 in which an upwardly displaceable supporting foot 129 is fastened which can be set in any one of a plurality of positions with the aid of a pin 130 and holes 131. The supporting foot can hold the machine frame when it is not coupled with a tractor.

The operation of the machine described above mainly corresponds with that of the machine first described.

With the large number of cultivating members supported in the frame portion 71 a strip of soil at least 5 ms. wide can be worked. Thus the capacity of the machine is extremely suitable for economically working large surfaces as found in the wheat regions of Canada and America. During operative running of the machine the spraying device comprising the spray nozzles 124 at the front may introduce growth stimulating material, insecticides or herbicides into the soil. The material is sprayed in the direction of the tines 109 that are in front of the frame portion 71 and the loosening effect of the tines can provide thorough mixing of the sprayed material with the soil. With the aid of the spraying device at the rear a fertilizer for example may be added through the spray nozzles 124 to the worked soil. The tines 119 on the carrier 115 mounted with the aid of the pivotable polygon 112A, displaceable in a direction of height against spring force during operation, can perform an effective aftertreatment. The tines 79 of the respective cultivating members 76 ensure a deep treatment. From FIGS. 13 and 14 it will be apparent that the spray nozzles 124 are directed so that their paths overlap one another at the level of the cultivating members.

FIGS. 17 and 18 show the frame portion provided on the top with a plurality of relatively spaced, brackets 132 fixed in place with the aid of the bolts 74 clamping the longitudinal edges of the parts 72 and 73 of the frame portion 71 to one another. By means of bolts 132A each of the brackets 132 is provided, near its longitudinal edges, with a support 133 extending to behind the frame portion and holding a beam 134 extending transversely of the direction of travel A and therefore parallel to the frame portion 71. If desired, further tools such as seed drills or planting machines to be combined with the cultivating machine can be mounted on this beam 134.

Furthermore a rotatable supporting member, for example, a roller supported by arms, may be arranged behind the cultivating members so as to be displaceable in a direction of height by means of the holes 100 and 101 in the plates 99.

While various features of the soil cultivating machines that have been described, and that are illustrated in the drawings, will be set forth in the following claims as inventive features, it is to be noted that the invention is not necessarily limited to these features and that it encompasses all of the features that have been described both individually and in various combinations.

I claim:

1. A soil cultivating machine comprising a frame and a plurality of rotatable soil working members mounted along the length of an elongated portion of said frame, said portion being hollow and extending transverse to the direction of travel, each of said members including an upwardly extending shaft that defines a respective axis of rotation, the lower end of said shaft comprising a carrier and a single tine fastened to said carrier, the upper end of said tine being a fastening portion and an operative portion depending from said fastening portion, said operative portion being eccentric relative to said axis of rotation, a curved portion joining the fastening and operative portions, at least the majority of said curved portion being located eccentrically of the center of said fastening portion and said curved portion also being positioned substantially eccentric relative to said rotary axis, adjacent said fastening portion, a supporting member positioned at each side of the frame portion and each supporting member comprising an upwardly displaceable, upwardly extending part that slideably cooperates with guide means, said guide means being supported on a substantially vertical side plate that closes the hollow frame portion and said guide means being resiliently movable with respect to the remainder of said frame portion.

2. A soil cultivating machine as claimed in claim 1, wherein said guide means includes at least one guide that is fastened to said plate, said guide having a U-shaped recess that slideably receives an edge of the upwardly extending part of the supporting member.

3. A soil cultivating machine as claimed in claim 2, wherein said guide is fastened to said plate by bolts which are movable horizontally against spring force, said bolts each extending transversely and being surrounded by a compression spring located between the head of the bolt and said plate.

4. A soil cultivating machine as claimed in claim 1, wherein a screen at the bottom of said frame portion is positioned to protect at least the forward sides of the soil working member shafts with respect to the direction of machine travel, said screen being elongated and fastened to said bottom in front of said shafts of the cultivating members.

5. A soil cultivating machine as claimed in claim 4, wherein a further screen on said bottom is located behind said shafts and each shaft is held by a bearing in a housing on the bottom of said frame portion, said screens extending beneath the bottom of the housings.

6. A soil cultivating machine as claimed in claim 5, wherein each shaft has a lower flange within a respective housing and the screens extend into a gap formed between said flange and a lower flat tine carrier.

7. A soil cultivating machine as claimed in claim 5, wherein each screen is a substantially U-shaped, elongated plate and one limb of said plate is fastened to said bottom, a further limb of said plate extending adjacent said shafts.

8. A soil cultivating machine as claimed in claim 7, wherein said lower limb has holes and bolts are passed through said holes to fasten the screen to said bottom, said bearing housing being also fastened by said bolts.

9. A soil cultivating machine as claimed in claim 1, wherein each cultivating member shaft mounts a lower bearing at its lower end, a housing surrounding said bearing and a pinion being located above said bearing on the shaft, said shaft, housing and pinion comprising a single, prefabricated unit that can be received by the lower part of said frame portion.

10. A soil cultivating machine as claimed in claim 1, wherein the operative tine portion tapers from said fastening portion towards its free end and is wedge-shaped, the larger dimension of said tine free end being substantially tangential to a circle centered on said rotary axis.

11. A soil cultivating machine comprising a frame and a plurality of rotatable soil working members mounted along the length of an elongated portion of said frame, said portion being hollow and extending transverse to the direction of travel, each of said members including an upwardly extending shaft that defines a respective axis of rotation, the lower end of said shaft comprising carrier means and a tine fastened to said carrier means, a supporting member positioned at each side of the frame portion and each supporting member comprising an upwardly displaceable, upwardly extending part that slideably co-operates with external guide members on a substantially vertical side plate that closes the hollow frame portion, said supporting member part together with guide members being resiliently movable laterally with respect to the remainder of said frame portion, said upwardly extending part being secured to said side plate in any one of a plurality of different level settings.

12. A soil cultivating machine as claimed in claim 11, wherein said guide members are U-shaped and bent-over edges of the supporting member part are fitted into said guide members, said guide members being bolted to said side plate with resilient fasteners that permit lateral deflections of the guide members and supporting member part together.

* * * * *